United States Patent [19]

Liu

[11] Patent Number: 5,685,993

[45] Date of Patent: Nov. 11, 1997

[54] APPARATUS AND METHOD FOR FERRITE FORMATION AND REMOVAL OF HEAVY METAL IONS BY FERRITE CO-PRECIPITATION FROM AQUEOUS SOLUTIONS

[75] Inventor: Qi Liu, Butte, Mont.

[73] Assignee: Pitts-Mont Environmental Reclamation Corporation, Pittsburgh, Pa.

[21] Appl. No.: 497,145

[22] Filed: Jun. 30, 1995

[51] Int. Cl.$^6$ .................. C02F 1/62; C02F 1/74; C02F 1/48

[52] U.S. Cl. .............. 210/695; 210/96.1; 210/205; 210/206; 210/220; 210/222; 210/721; 210/722; 210/743; 210/912; 423/632; 423/633; 423/140

[58] Field of Search .................. 423/632, 633, 423/140; 210/721, 722, 912, 695, 205, 206, 220, 222, 96.1, 743, 143

[56] References Cited

U.S. PATENT DOCUMENTS

| | | | |
|---|---|---|---|
| 3,617,559 | 11/1971 | Cywin | 210/722 |
| 3,931,007 | 1/1976 | Sugano et al. | 210/721 |
| 4,119,536 | 10/1978 | Iwase et al. | 210/722 |

OTHER PUBLICATIONS

Y. Tamaura et al. "Ferrite Process: Heavy Metal Ions Treatment Systems", Wat. Sci. Tech., vol. 23, 1991, pp. 1893–1900.

K. Yang et al., "Removal of Heavy Metal Ions From Acid Mine Water By Ferrite Coprecipitation Process", Separation Processes: Heavy Metals, Ions and Minerals, The Minerals, Metals & Materials Society, 1994, pp. 37–48.

Primary Examiner—Neil McCarthy
Attorney, Agent, or Firm—Webb Ziesenheim Bruening Logsdon Orkin & Hanson, P.C.

[57] ABSTRACT

Embodiments of an apparatus and method for ferrite formation and the removal of heavy metal ions by ferrite co-precipitation from an aqueous solution at ambient temperature have been developed. Magnetically susceptible ferrite crystals can be continuously formed from aqueous solution and the heavy metal ion solution can be continuously treated by the ferrite co-precipitation process. The heavy metal ions are incorporated into the lattice points of the spinel ferrite structures. The precipitates of ferrite materials can then be magnetically separated. The main apparatus includes a ferrous sulfate mixing tank with a feeder assembly; a reaction tank or, alternatively, neutralization and oxidation tanks; settling and polishing tanks; and a magnetic separator. The reaction tank or oxidation tank includes an air distributor; a pH controller; and promoter feeding and ferrite product recirculating systems.

45 Claims, 5 Drawing Sheets

APPARATUS AND METHOD FOR FERRITE FORMATION AND REMOVAL OF HEAVY METAL IONS BY FERRITE CO-PRECIPITATION FROM AQUEOUS SOLUTIONS

BACKGROUND OF THE INVENTION

1. Field of the Invention

This invention relates generally to the formation of magnetically susceptible ferrite crystals and the removal of heavy metal ions by ferrite co-precipitation from aqueous solutions and, more particularly, to an apparatus and method for the continuous ferrite formation and removal of heavy metal ions from aqueous solutions such as acid mine water or laboratory and industrial waste solutions at ambient temperature.

2. Description of the Prior Art

Acidic waste water containing dissolved concentrations of heavy metal ions is one of the largest environmental problems facing the mining, mineral processing and electroplating industries today. In the mining industry, for example, it is common for a mine area to contain sulfide minerals and heavy metals either in the ore or the surrounding waste rock. When the sulfide minerals are exposed to air, rain or groundwater and bacteria, they are oxidized to produce sulfuric acid. This sulfuric acid solubilizes the heavy metals present in the surrounding rock to form acid mine water having a very low pH value and containing high concentrations of iron and other dissolved heavy metals. This acid mine water creates a serious environmental threat because if it is left unchecked, it will eventually contaminate the groundwater supply and local water sources with heavy metals thus damaging the health of plants, wildlife, fish and humans.

Over the years, the preventative control approach and the water treatment approach have been utilized for the control of waste solids and the treatment of acid mine water as well as industrial effluents. The preventative control approach for waste solids focuses on the removal of sulfides, control of bacterial activity and oxygen diffusion, coating of sulfide particles and agglomeration of tailings. The water treatment approach focuses on neutralization and precipitation of metal hydroxides and metal sulfides, absorption, ion exchange, membrane separation and biological treatment.

With respect to the treatment and recovery of heavy metal ions from acid mine water, the conventional approach has been lime neutralization to precipitate the dissolved metal ions in the form of metal hydroxides. However, the precipitated hydroxides are difficult to filter, unstable when returned to the environment and are not economically useful products. Thus, these precipitated hydroxides are usually stored as "hydroxide sludge". Another precipitation technique utilizes a precipitating agent, such as sodium sulfide, to produce metal sulfides which are more chemically stable than the hydroxides. However, the sulfide procedure generally requires the use of toxic reagents and results in the production of a hazardous gas, hydrogen sulfide, during the precipitation process when an excess of sodium sulfide is used.

As an alternative to these prior art mine water processing methods, ferrite precipitation processes have recently been suggested for the treatment of laboratory waste waters containing heavy metal ions. The advantages of the ferrite precipitation process include (1) simultaneous treatment of various kinds of heavy metal ions; (2) the precipitated ferrite crystals are chemically stable in the environment; (3) filtration is relatively easy and magnetic separation is possible; (4) the divalent compounds added during the precipitation process are readily available and relatively inexpensive; and (5) the precipitates are in the form of spinel ferrite by-products and can be readily reused as magnetically susceptible materials.

In the ferrite process, heavy metal ions are removed from solution and are positioned at the lattice points of the resulting spinel ferrite crystal. These incorporated metal ions are not easily leached from the ferrite crystal structure. The stable ferrite crystals or specialized ferrite can then be reused as useful magnetically susceptible materials.

In the ferrite process, ferrous sulfate is added to the waste water and the pH is adjusted by the addition of a base. The suspension is then oxidized to form spinel ferrite crystals which precipitate from the solution. Once ferrite crystallization begins, magnetic techniques are used to separate the ferrite crystals from the processed water. The ferrite formation reactions are as follows, with the "M" indicating heavy metals.

Mechanism 1:

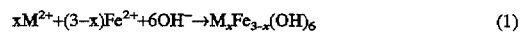  (1)

  (2)

Mechanism 2:

  (3)

  (4)

  (5)

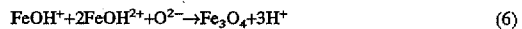  (6)

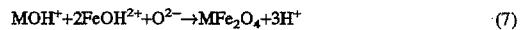  (7)

The use of a batch ferrite process in treating laboratory wastes and acid mine water has previously been suggested. For example, Tamaura et al. (Y. Tamaura et al., "Ferrite Process; Heavy Metal Ions Treatment System", *Wat Sci Tech*, vol. 23, 1991, pp. 1893–1900) report a batch process for ferrite formation from water, such as laboratory waste water. However, this process teaches heating the waste water to elevated temperatures (65° C.) for ferrite formation. While this batch process would be adequate for most small scale laboratory uses, the Tamaura et al. process is not economically practical for large scale commercial processes, such as treatment of large quantities of acid mine water, because of the relatively high temperatures required and the length of time required to process each batch of waste water.

As an alternative to high temperature treatment processes, several types of modified ferrite precipitation processes have been developed which can be used at ambient temperature. Several such modified ferrite processes are described by Yang et al. (Yang et al., "Separation Processes: Heavy Metals, Ions and Minerals", *The Minerals, Metals & Materials Society*, 1994). In one such process, ferrous sulfate is dissolved in the acid mine water and the pH value is adjusted by the addition of sodium hydroxide. After a certain retention time, the hydroxides begin to form. This slurry is oxidized and aged at room temperature to form ferrite crystals. The formed ferrite crystals are then magnetically separated from the solution. This process is a separate batch process. The first step is to form metal hydroxides without oxidation. The hydroxides are then oxidized to form ferrite. Again, the batch process taught by Yang et al. is not economically practical for treating large volumes of acid mine water due to the required long aging time to recover ferrite crystals.

While the above-described ferrite precipitation batch processes may be adequate for small scale industrial or laboratory uses, these batch processes are inappropriate for large scale acid mine water cleanup because of the elevated temperatures and the time required either for processing each batch of mine water or for aging. Therefore, it is an object of the invention to provide a continuous flow treatment apparatus and method for ferrite formation and removal of heavy metal ions by ferrite co-precipitation from aqueous solutions at ambient temperature.

SUMMARY OF THE INVENTION

An assembly for ferrite formation and removal of heavy metal ions by ferrite co-precipitation from aqueous solution includes an untreated water tank which is in flow communication with a first mixing tank. A first feeder assembly is in material flow communication with the first mixing tank. A first agitator assembly having a first agitator extends into the interior of the first mixing tank and a reaction tank is in fluid communication with the first mixing tank. The assembly further includes an air source in flow communication with the interior of the reaction tank and a pH assembly for monitoring and controlling the pH of the water in the reaction tank. A settling tank is in flow communication with the reaction tank and a polishing tank is in flow communication with the settling tank. A magnetic separation assembly is connected to the settling tank to remove magnetically susceptible ferrite crystals from the settling tank.

A method for continuous ferrite formation and removal of heavy metal ions by ferrite co-precipitation from aqueous solution includes pumping untreated water having dissolved heavy metal ions into a first mixing tank, adding ferrous sulfate to said untreated water and said first mixing tank to form a solution in which the molar ratio of iron to heavy metal is greater than 3, agitating the solution in the first mixing tank, transporting the agitated solution from the first mixing tank into a reaction tank, agitating the solution in the reaction tank, distributing air through the solution in the reaction tank, adding a base to the solution in the reaction tank to adjust and control the pH of the solution to a value greater than 10, forming a ferrite slurry in the reaction tank, and transporting the ferrite slurry from the reaction tank to a settling tank where ferrite crystals precipitate to the bottom of the settling tank.

An assembly for ferrite formation and the removal of heavy metal ions by ferrite co-precipitation from aqueous solution includes means for pumping untreated water having dissolved heavy metal ions into a first mixing tank and means for adding ferrous sulfate to the untreated water in the first mixing tank to form a solution in which the molar ratio of iron to heavy metal is greater than 3. Means are provided for agitating the solution in the first mixing tank and transporting the agitated solution from the first mixing tank to a reaction tank. The assembly further includes means for agitating the solution in the reaction tank, means for distributing air through the solution in the reaction tank, means for adding a base to the solution in the reaction tank to adjust and control the pH of the solution to a value greater than 10, means for forming a ferrite slurry in the reaction tank, and means for transporting the ferrite slurry from the reaction tank to a settling tank where ferrite crystals precipitate to the bottom of the settling tank.

An assembly for ferrite formation and removal of heavy metal ions by ferrite co-precipitation from aqueous solution includes an untreated water tank in flow communication with a first mixing tank. A first feeder assembly is in material flow communication with the first mixing tank. A first agitator assembly has a first agitator extending into the interior of the first mixing tank and a neutralization tank is in flow communication with the first mixing tank. A second agitator assembly having a second agitator extends into the interior of a neutralization tank. An oxidation tank is in flow communication with the neutralization tank. An air supply conduit extends into the oxidation tank and a first pH sensor is located in the neutralization tank. A second pH sensor is provided in the oxidation tank and a pH control assembly is in electronic communication with the first and second pH sensors wherein the pH control assembly controls the pH of the water in the neutralization tank and the oxidation tank to a desired value. A settling tank is in flow communication with the oxidation tank and a polishing tank is in flow communication with the settling tank. A magnetic separation assembly is connected to the settling tank to remove magnetically susceptible ferrite crystals from the settling tank.

A method for continuous ferrite formation and removal of heavy metal ions by ferrite co-precipitation from aqueous solution includes pumping untreated water having dissolved heavy metal ions into a first mixing tank, adding ferrous sulfate to the untreated water in the first mixing tank to form a solution in which the molar ratio of iron to heavy metal is greater than 3, agitating the solution in the first mixing tank, transporting the agitated solution from the first mixing tank into a neutralization tank, agitating the solution in the neutralization tank, adding a base to the solution in the neutralization tank to adjust and control the pH of the solution to a value greater than 10, transporting the agitated solution from the neutralization tank into an oxidation tank, distributing air through the solution in the oxidation tank, agitating the solution in the oxidation tank, adding a base to the solution in the oxidation tank to control the pH of the solution to a value greater than 10, forming a ferrite slurry in the oxidation tank, and transporting the ferrite slurry from the oxidation tank into a settling tank where ferrite crystals precipitate to the bottom of the settling tank.

An assembly for ferrite formation and removal of heavy metal ions by ferrite co-precipitation from aqueous solution includes means for pumping untreated water having dissolved heavy metal ions into a first mixing tank and means for adding ferrous sulfate to the untreated water in the first mixing tank to form a solution in which the molar ratio of iron to heavy metal is greater than 3. The assembly further includes means for agitating solution in the first mixing tank, means for transporting the agitated solution from the first mixing tank into a neutralization tank and means for agitating the solution in the neutralization tank. The means are provided for adding a base to the solution in the neutralization tank to adjust and control the pH of the solution to a value greater than 10. The assembly further includes means for transporting the agitated solution from the neutralization tank into an oxidation tank, means for distributing air through the solution in the oxidation tank, means for agitating the solution in the oxidation tank, means for adding a base to the solution in the oxidation tank to adjust and control the pH of the solution to a value greater than 10 and means for forming a ferrite slurry in the oxidation tank. Transporting means are provided for transporting the ferrite slurry from the oxidation tank into a settling tank where ferrite crystals precipitate to the bottom of the settling tank.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
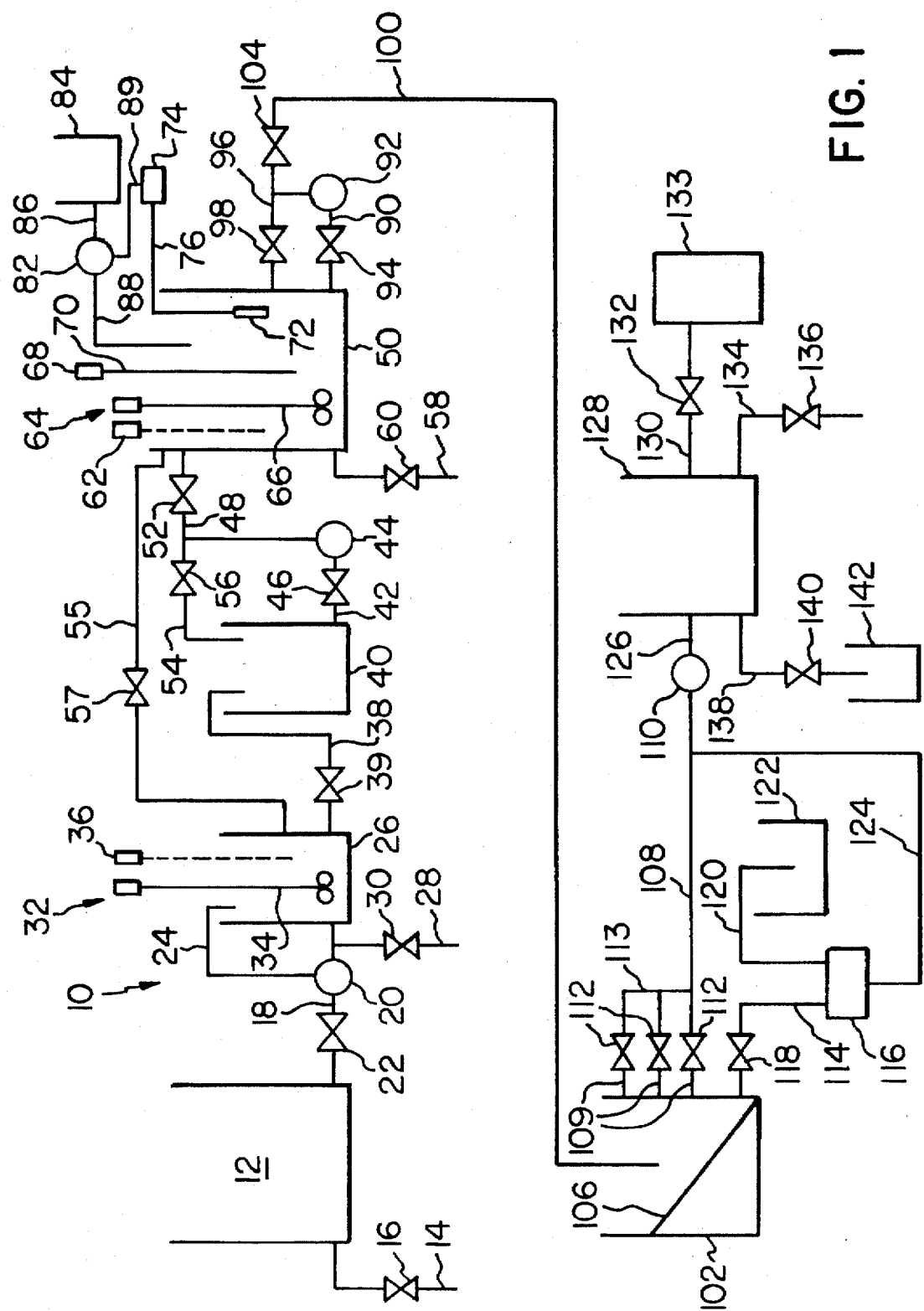
FIG. 1 is a schematic flow diagram of a first embodiment of a continuous flow treatment system for ferrite formation and removal of heavy metal ions by ferrite co-precipitation from aqueous solutions.

An assembly for continuous ferrite formation and removal of heavy metal ions from aqueous solutions by forming ferrite crystals which can be magnetically separated from the solution is generally designated 10 in FIGS. 1–5 of the drawings. The embodiment shown in FIG. 1 of the drawings includes an untreated water tank 12 having a drain line 14 attached near the bottom and a control valve 16 located therein. A conduit 18 extends from water tank 12 to the suction side of a pump 20 and a shutoff valve 22 is located in conduit 18 between tank 12 and pump 20.

A discharge conduit 24 extends from the discharge side of pump 20 to a first mixing tank 26. First mixing tank 26 includes a drain conduit 28 having a control valve 30 disposed therein. An agitator assembly 32 is positioned above first mixing tank 26 and an agitator 34 extends downwardly into the interior of first mixing tank 26. A first feeder assembly 36 is located above, and in material communication with, first mixing tank 26. A conduit 38 extends between first mixing tank 26 and a second mixing tank 40 and a shutoff valve 39 is located therein. A conduit 42 extends from second mixing tank 40 to the suction side of a pump 44 and a shutoff valve 46 is located in conduit 42.

A conduit 48 extends from the discharge side of pump 44 to a reaction tank 50. A shutoff valve 52 is located in conduit 48 between pump 44 and reaction tank 50. A recirculation conduit 54 extends from the discharge side of pump 44 to second mixing tank 40 and a recirculation control valve 56 is located in recirculation conduit 54. A bypass conduit 55 extends between first mixing tank 26 and reaction tank 50 and has a shutoff valve 57 located therein.

Reaction tank 50 includes a drain conduit 58 having a shutoff valve 60. A second feeder assembly 62 is located above, and in material communication with, reaction tank 50. An agitator assembly 64 is positioned above reaction tank 50 and an agitator 66 extends downwardly into the interior of reaction tank 50.

An air supply 68 is positioned above reaction tank 50 and an air supply conduit 70 extends downwardly into the interior of reaction tank 50. A pH sensor 72 is located in reaction tank 50 and is connected to a pH control assembly 74 by wiring 76. The suction side of a pump 82 is connected to a chemical mixing tank 84 by a conduit 86 and a conduit 88 connects the discharge side of pump 82 to reaction tank 50. A control cable 89 extends between pH control assembly 74 and pump 82. A conduit 90 extends between reaction tank 50 and the suction side of a pump 92 and a shutoff valve 94 is located in conduit 90. A recirculation conduit 96 extends from the discharge side of pump 92 to reaction tank 50 and a shutoff valve 98 is located therein.

A conduit 100 extends from the discharge side of pump 92 to a settling tank 102 and a shutoff valve 104 is located therein. Settling tank 102 may be a magnetic sweep assist settling tank. Settling tank 102 has a cone shaped or sloping bottom 106 and a main liquid discharge conduit 108 extends from settling tank 102 to a pump 110. A series of discharge pipes 109 are attached at varying heights to settling tank 102. Each discharge pipe 109 has a shutoff valve 112 located therein. A discharge end of each discharge pipe 109 is connected to a discharge header 113 which is attached to main liquid discharge conduit 108. Shutoff valves 112 control the discharge level in settling tank 102. A precipitate conduit 114 is located near the lower edge of cone shaped or sloping bottom 106 in settling tank 102 and extends from settling tank 102 to a magnetic separator 116. A shutoff valve 118 is located in precipitate conduit 114.

A magnetic particle conduit 120 extends from magnetic separator 116 to a magnetic particle collection tank 122. A fluid conduit 124 extends from magnetic separator 116 to the suction side of pump 110. A discharge conduit 126 extends from the discharge side of pump 110 to a polishing tank 128. A water discharge conduit 130 having a shutoff valve 132 extends from polishing tank 128 to a treated water storage tank 133. A drain conduit 134 having a shutoff valve 136 is located near the bottom of polishing tank 128. A particle conduit 138 having a shutoff valve 140 extends from polishing tank 128 to a magnetic particle collection tank 142.

Figure 2:
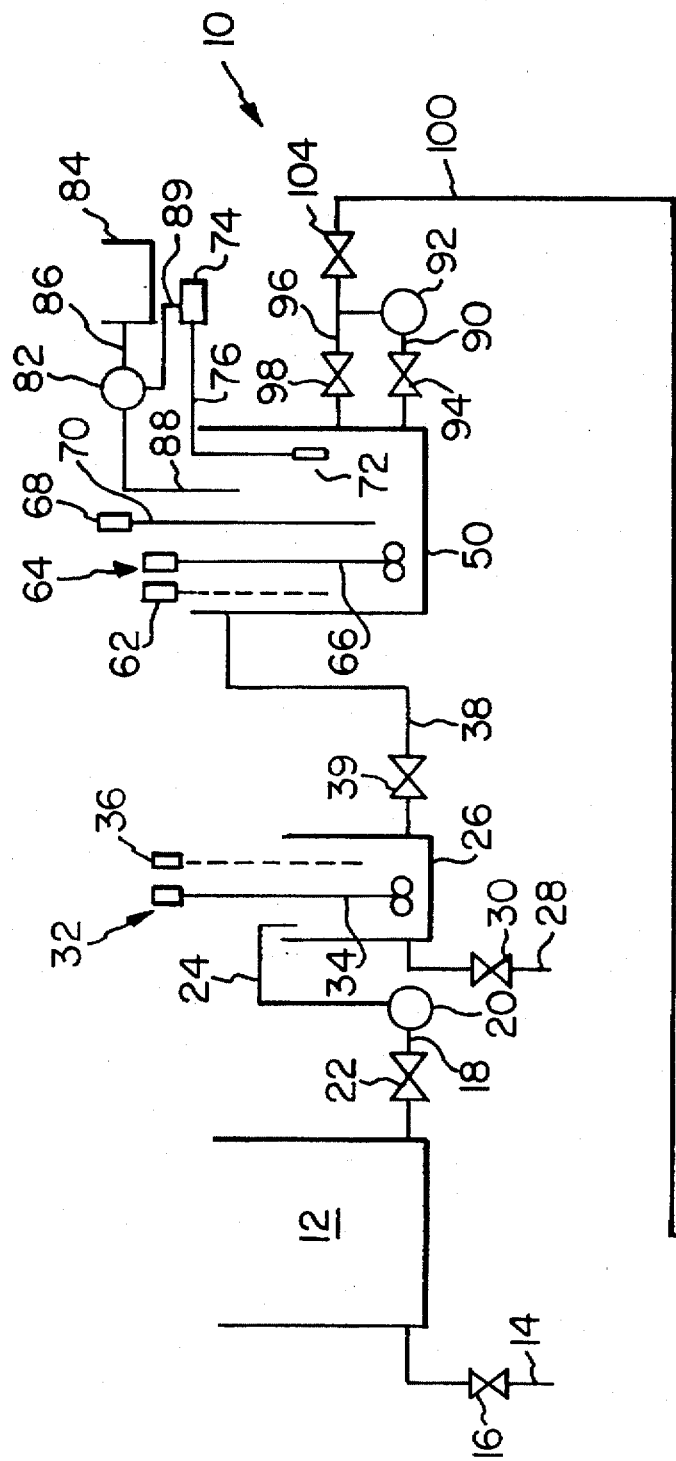
FIG. 2 is a modified version of the continuous treatment system shown in FIG. 1.
Figure 2:
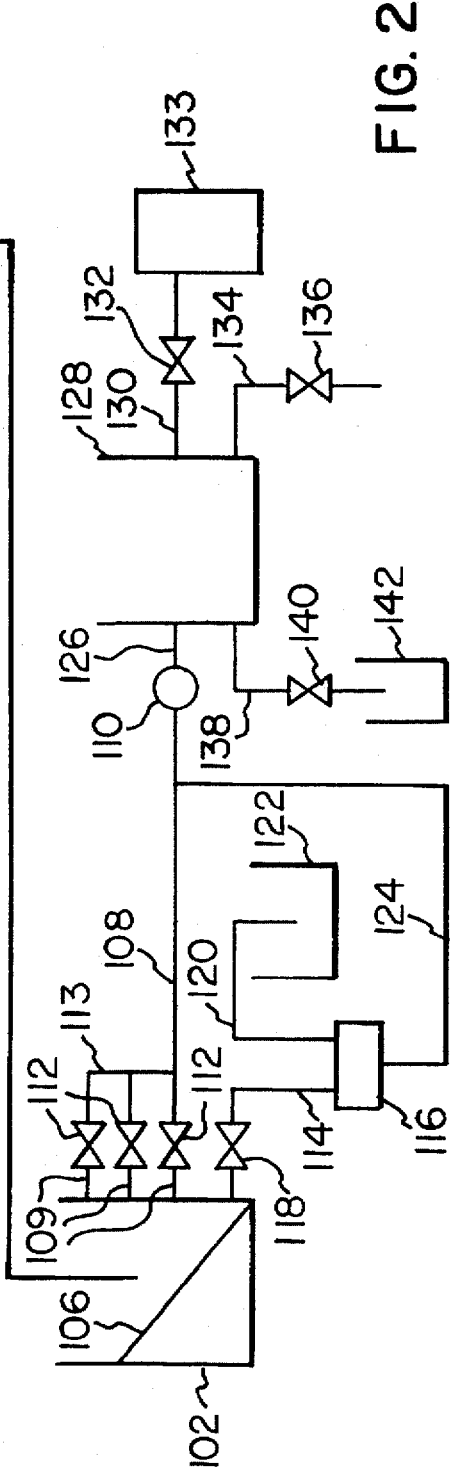

The embodiment of the assembly is shown in FIG. 2 of the drawings. This assembly differs from the assembly shown in FIG. 1 in that conduit 38 extends directly from first mixing tank 26 to reaction tank 50 in the assembly illustrated in FIG. 2. This eliminates the second mixing tank 40 and the conduits 42, 48, 54 and the pump 44 associated therewith.

Figure 3:
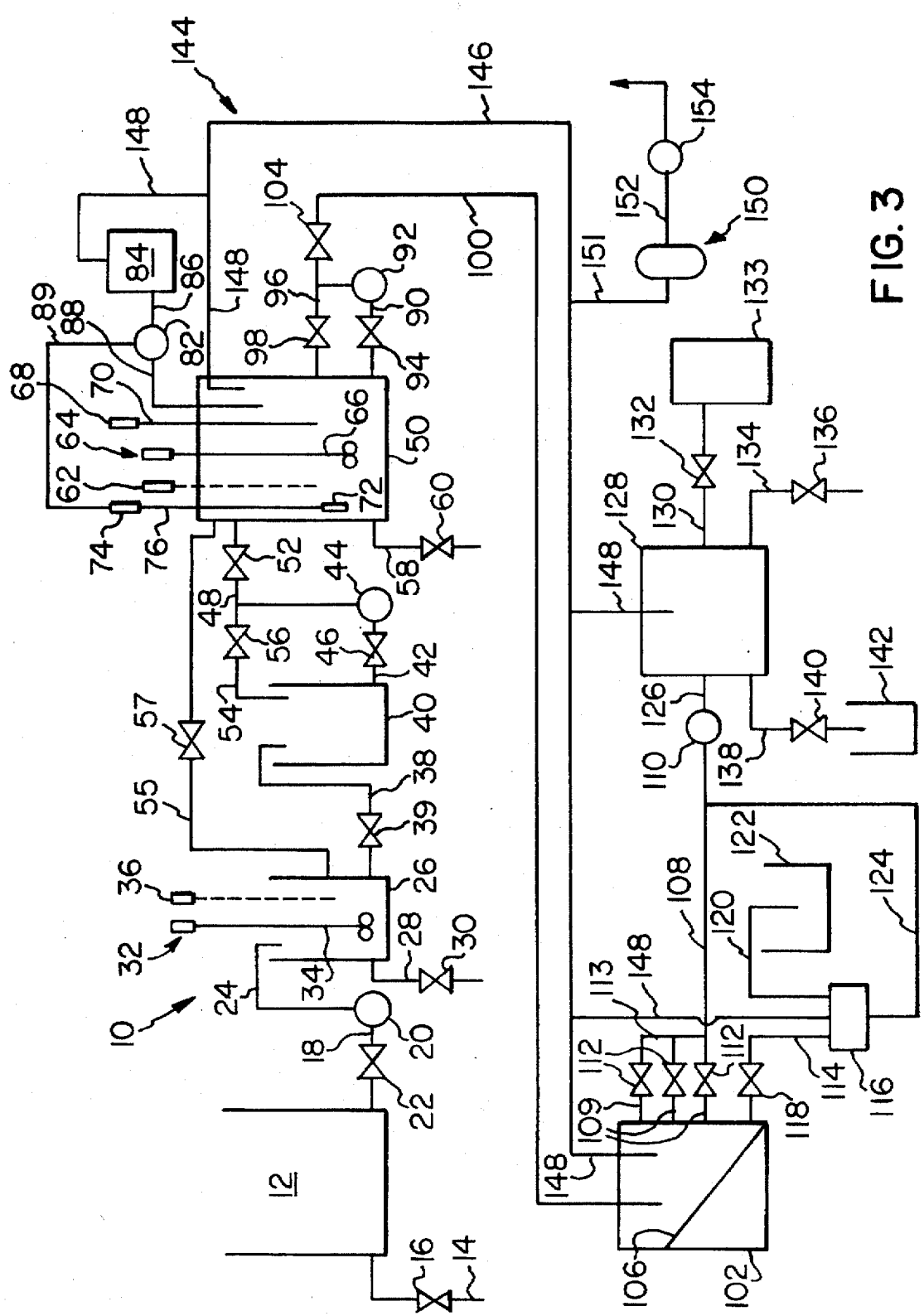
FIG. 3 is a second embodiment of a continuous treatment system.

The embodiment of the assembly shown in FIG. 3 of the drawings is similar to the embodiment shown in FIG. 1 of the drawings but includes a gas collection system 144. In the assembly shown in FIG. 3, reaction tank 50, chemical mixing tank 84, magnetic sweep assist settling tank 102, magnetic separator 116, and polishing tank 128 are closed units and are all connected to a main gas collection header 146 by gas collection conduits 148. Gas collection header 146 is connected to a gas scrubber assembly 150 by a conduit 151. A gas discharge conduit 152 extends from scrubber assembly 150 and has a fan assembly 154 located therein.

In the assemblies shown in FIGS. 1–3 of the drawings, the neutralization and oxidation reactions for the waste water both take place in reaction tank 50. The embodiments shown in FIGS. 4 and 5 of the drawings differ from the assemblies shown in FIGS. 1–3 in that the assemblies shown in FIGS. 4 and 5, the neutralization and oxidation steps, take place in separate tanks. In the assembly shown in FIG. 4, for example, conduit 38 extends between first mixing tank 26 and the input of a pump 158. A discharge conduit 160 from pump 158 is connected to a recirculation conduit 162 and a conduit 164. Recirculation conduit 162 is in flow communication with the interior of first mixing tank 26 and includes a recirculation shutoff valve 166. Conduit 164 includes a shutoff valve 168 and extends into an interior of a neutralization tank 170. Neutralization tank 170 includes a drain conduit 172 having a drain valve 174.

An agitation assembly 176 is located above neutralization tank 170 and has an agitator 178 which extends downward into the interior of neutralization tank 170. A discharge conduit 180 extends between neutralization tank 170 and an oxidation tank 182. Discharge conduit 180 includes a shutoff valve 183 and a discharge pump 184.

A drain conduit 186 is attached near the bottom of oxidation tank 182 and includes a shutoff valve 188. An agitator assembly 190 is located above oxidation tank 182 and has an agitator 192 which extends downward into the interior of oxidation tank 182. Air supply conduit 70 extends into the interior of oxidation tank 182 and second feeder assembly 62 is in flow communication with the interior of oxidation tank 182.

A pH sensor 194 is located inside neutralization tank 170 and is connected by a cable 196 to pH control assembly 74. A second pH sensor 198 is located inside oxidation tank 182 and is connected to pH control assembly 74 by a cable 200.

Conduit 86 extends between chemical mixing tank 84 and the suction side of pump 82. Conduit 88 extends between pump 82 and a valve 202. Valve 202 may be a three-way valve. A conduit 204 extends between valve 202 and the interior of oxidation tank 182. A conduit 206 extends between valve 202 and the interior of neutralization tank 170. Control cable 89 extends between pH control assembly 74 and pump 82 and a control cable 208 extends between pH control assembly 74 and valve 202.

Figure 4:
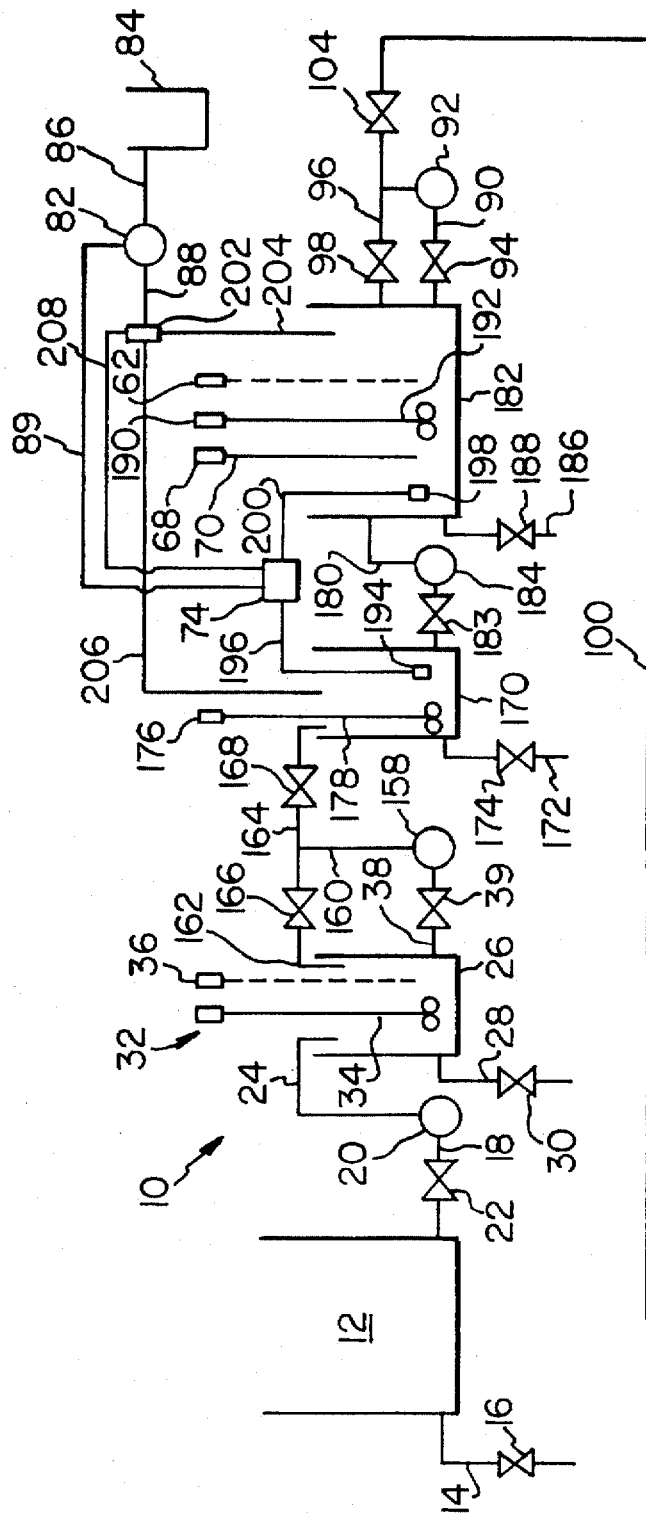
FIG. 4 is a third embodiment of a continuous treatment system.
Figure 4:
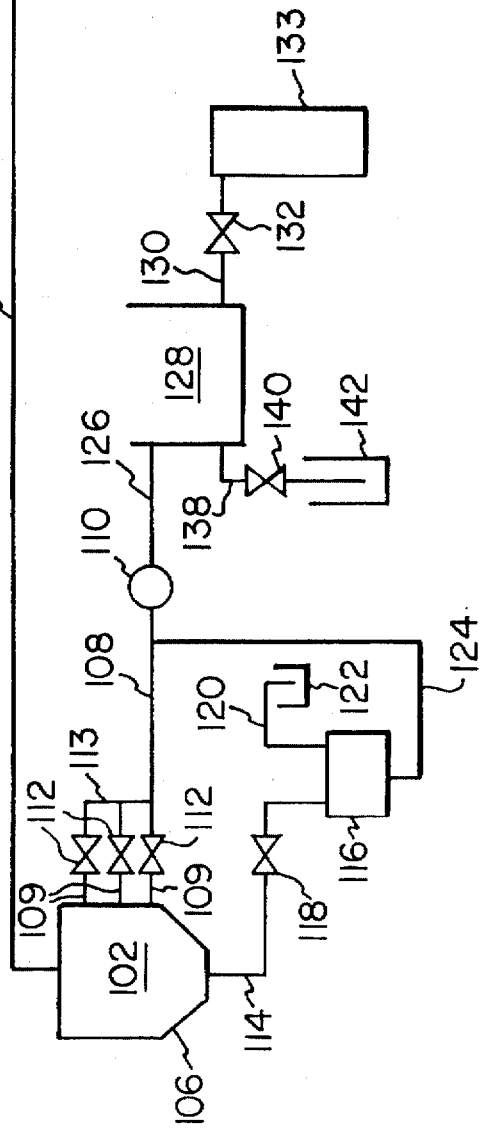
Figure 5:
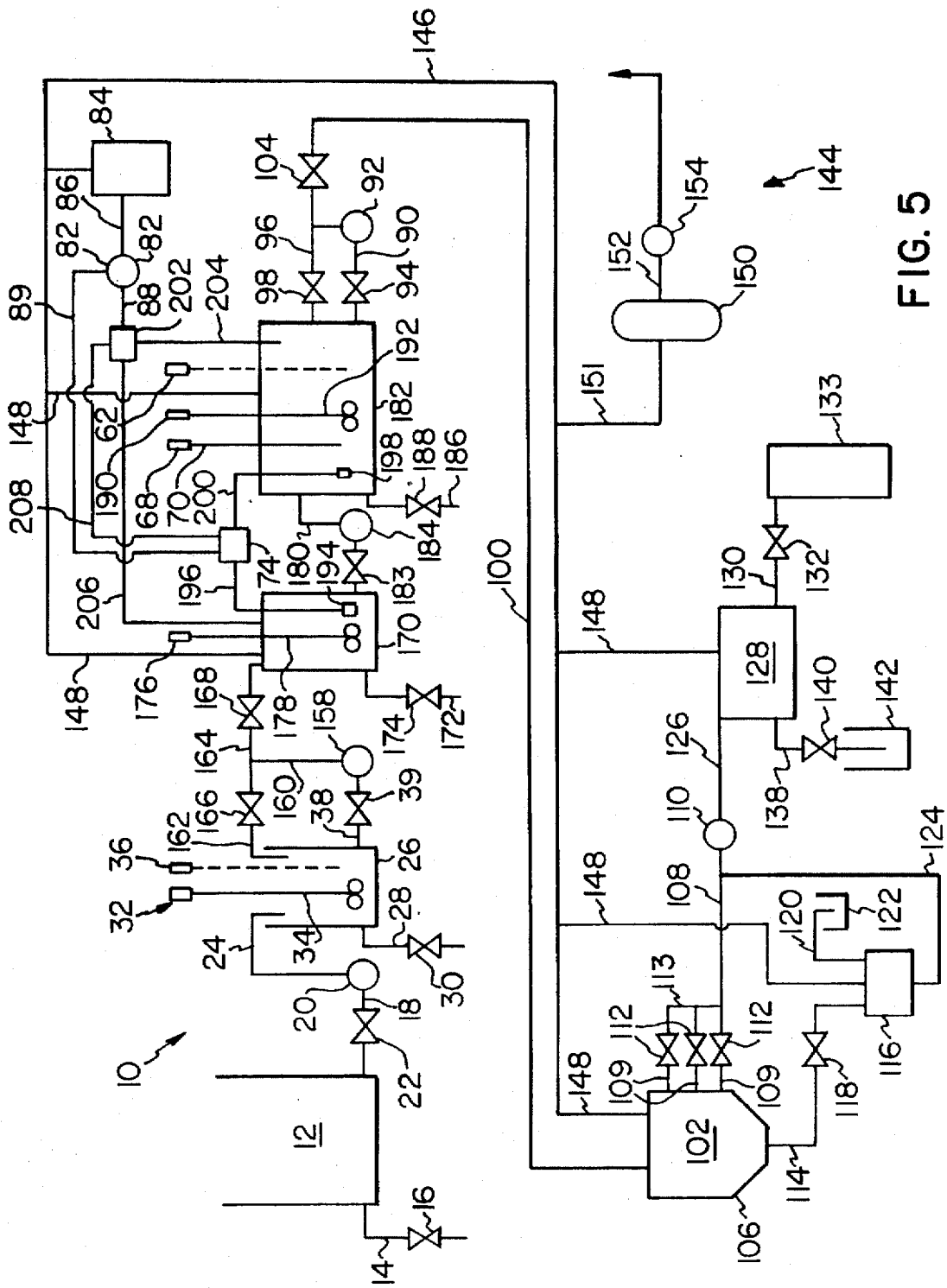
FIG. 5 is a modified version of the continuous treatment system shown in FIG. 4.

The embodiment shown in FIG. 5 of the drawings is similar to the assembly shown in FIG. 4 of the drawings but includes a gas collection system 144 in which neutralization tank 170, oxidation tank 182, chemical mixing tank 84, settling tank 102, magnetic separator 116 and polishing tank 128 are connected to a gas collection header 146 by gas collection conduits 148.

A preferred method of operating the continuous flow assemblies shown in FIGS. 1–5 to form magnetically susceptible ferrite crystals and remove heavy metal ions by ferrite co-precipitation from aqueous solutions will now be described. Looking first at the assemblies shown in FIGS. 1 and 2, untreated water tank 12 is filled with, for example, city water or acid mine water which is pumped by pump 20 through conduits 18 and 24 into first mixing tank 26. If the process is used for treating acid mine water, in order to obtain magnetically susceptible ferrite crystals, the Fe/M molar ratio should be greater than 3. Therefore, ferrous sulfate is added by first feeder assembly 36 to the water in first mixing tank 26 and the solution is agitated by agitator assembly 32. In the device shown in FIG. 2 of the drawings, the agitated solution is pumped through conduit 38 directly into reaction tank 50. In the device shown in FIG. 1 of the drawings, the agitated solution is pumped from first mixing tank 26 through conduit 38 into second mixing tank 40 before being pumped through conduits 42 and 52 by pump 44 into reaction tank 50. The device shown in FIG. 1 allows for recirculation of a portion of the agitated solution through recirculation conduit 54 back into second mixing tank 40 thus effectively increasing the agitation efficiency of the solution.

The solution is then further agitated and mixed in reaction tank 50 by agitator assembly 64. If the system is employed for treating acid mine water, a small amount of ferrite material may be added into the solution in the reaction tank 50 by second feeder assembly 62 to act as seeding material to promote the formation of ferrite crystals. Air supplied by air supply 68 flows through air supply conduit 70 and is distributed through the solution in reaction tank 50. The pH of the agitated solution in reaction tank 50 is sensed by pH sensor 72 and this information is transmitted to pH control assembly 74. If the pH of the agitated solution is below a set value, pH control assembly 74 activates pump 82 to pump a suitable base, such as sodium hydroxide, from chemical mixing tank 84 into the agitated solution to adjust and control the pH of the agitated solution to above 10, preferably 10.5. In preferred embodiments shown in FIGS. 1 and 2 of the drawings, eight molar sodium hydroxide solution in chemical mixing tank 84 is pumped into reaction tank 50 through conduit 86 to reach the desired pH. Shutoff valve 94 remains closed until approximately 45–60 minutes retention time in the reaction tank 50 has been reached. Magnetically susceptible ferrite crystals will then begin to form in the reaction tank according to previously described Mechanisms 1 and 2. Thereafter, shutoff valve 94 is throttled open to allow the ferrite slurry to flow from reaction tank 50 through pump 92 at substantially the same flow rate as the inlet flow rate of reaction tank 50. Thereafter, the flow rates of solution into and slurry out of reaction tank 50 remain about equal. If necessary, a small amount of ferrite material may be added to the solution in reaction tank 50 by second feeder assembly 62 to act as seeding material to promote the formation of ferrite crystals. Alternatively, recirculation conduit 96 can be opened to allow a portion of the ferrite slurry flowing through pump 92 to be recirculated back into reaction tank 50 to also act as a ferrite formation promoter and to further agitate the slurry.

The ferrite slurry from reaction tank 50 is then pumped by pump 92 through conduit 100 into magnetic sweep assist settling tank 102. The solid ferrite crystals settle rapidly out of solution and flow down a cone shaped bottom (not shown) or a sloping bottom wall 106, through precipitate conduit 114 and into magnetic separator 116 where the magnetically susceptible ferrite crystals are separated from the aqueous solution. The magnetic ferrite crystals flow through magnetic particle conduit 120 into magnetic particle collection tank 122 and the aqueous solution flows through conduit 124 to the suction side of pump 110. Shutoff valves 112 are throttled to control the discharge level of supernatant aqueous solution from settling tank 102. Aqueous solution from settling tank 102 flows through conduits 109, into header 113 and then into liquid discharge conduit 108 to allow the treated water to flow from settling tank 102 to the suction side of pump 110 where it is combined with the treated water from magnetic separator 116 to flow through conduit 126 into polishing tank 128. The treated water then flows through discharge conduit 130 into treated water storage tanks 133. Any residual precipitate can flow through particle conduit 138 into magnetic particle collection tank 142. Thus, either magnetically susceptible ferrite crystals are formed from the water or the heavy metal ions are removed from the acid mine water by ferrite co-precipitation and economically valuable ferrite crystals are recovered by magnetic separator 116.

Operation of the embodiment shown in FIG. 3 of the drawings is similar to that for the embodiments shown in FIGS. 1 and 2 of the drawings but permits the collection of process gas, for example, ammonia gas, from the system. In the device shown in FIG. 3, ammonium hydroxide solution (30%) is used instead of sodium hydroxide to control the pH of the solution in reaction tank 50. Ammonium hydroxide solution is added to the solution in reaction tank 50. The ammonia gas evaporated during operation of the embodiment shown in FIG. 3 is routed to a main gas collection header 146 and into a scrubber assembly 150 where the ammonia gas is recovered as ammonium hydroxide. The vacuum pressure is provided by discharge conduit 152 and fan assembly 154.

When ammonium hydroxide is used as the base in chemical mixing tank 84, ammonium sulfate will be present in the treated water after ferrite co-precipitation. This treated water can therefore be used as agricultural water by the farming industry. Alternatively, calcium hydroxide or calcium oxide can be added to this treated water to precipitate calcium sulfate and recover ammonium hydroxide as follows:

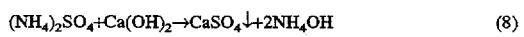
$$(NH_4)_2SO_4 + Ca(OH)_2 \rightarrow CaSO_4 \downarrow + 2NH_4OH \quad (8)$$

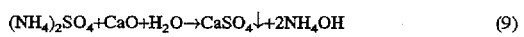
$$(NH_4)_2SO_4 + CaO + H_2O \rightarrow CaSO_4 \downarrow + 2NH_4OH \quad (9)$$

$$NH_4OH \rightleftharpoons NH_3\uparrow + H_2O \tag{10}$$

Calcium sulfate has a very low solubility in water and ammonium hydroxide tends to release ammonia gas at high pH. This ammonia gas can be collected and recycled thus enhancing the economical efficiency of the above-described device.

In the embodiment shown in FIG. 4 of the drawings, agitated solution from first mixing tank 26 is pumped by pump 158 into discharge conduit 160. The solution then flows through conduit 164 into neutralization tank 170. A portion of the solution may be recirculated into first mixing tank 26 through recirculation conduit 162.

In neutralization tank 170, the solution is agitated by agitator 178 and the pH of the solution is adjusted to a level above 10 as will be described hereinafter. After a certain retention time, the agitated solution from neutralization tank 170 is pumped through conduit 180 by pump 184 into oxidation tank 182. The solution is then further agitated and mixed in oxidation tank 182 by agitator assembly 190. If the system is to be used for treating acid mine water, a small amount of ferrite material may be added to the solution in oxidation tank 182 by second feeder assembly 62 to act as seeding material to promote formation of ferrite crystals. Air supplied by air supply 68 flows through air supply conduit 70 and is distributed throughout the agitated slurry solution in oxidation tank 182.

The pH of the solutions in neutralization tank 170 and oxidation tank 182 is controlled by pH control assembly 74. pH sensor 194 in neutralization tank 170 senses the pH of the solution in neutralization tank 170 and transmits this information through cable 196 to pH control assembly 74. If the pH of the solution in neutralization tank 170 is below 10, control assembly 74 activates pump 82 and adjusts valve 202 to supply more base solution to neutralization tank 170 through conduit 206 until the desired pH level is reached. In a similar manner, pH sensor 198 in contact with the slurry solution in oxidation tank 182 transmits pH information through cable 200 to pH control assembly 74. If the pH of the solution in oxidation tank 182 is below 10, control assembly 74 activates pump 82 and adjusts valve 202 to supply more base solution to oxidation tank 182 through conduit 204.

The embodiment shown in FIG. 5 of the drawings is similar to the embodiment shown in FIG. 4 of the drawings but further includes gas collection system 144 as was previously described. The gas collection system 144 shown in FIG. 5 operates in the same manner as previously discussed with respect to the embodiment shown in FIG. 3.

Test runs using the above-described devices have been carried out to make magnetic ferrite crystals and treat synthetic acidic heavy metal ions solution by ferrite co-precipitation in Butte, Mont.

FERRITE FORMATION FROM AQUEOUS SOLUTION

EXAMPLE 1

The embodiment shown in FIG. 2 of the drawings was used for the formation of ferrite from an aqueous solution. The initial operating system parameters were as follows:

water flow rate: 2 gal/min ferrous sulfate feeder: 132 g/min sodium hydroxide solution (SM): 147 ml/min retention time: 20 min air flow rate: 20–40 SCFH temperature: 20° C.

The particle suspension in the reaction tank was pumped into the magnetic sweep assist settling tank when the volume of water in the reaction tank reached 40 gallons and the solution was green in color. After 1 hour, it was determined that the ferrous hydroxide was not completely oxidized. The air flow rate was increased to 60 SCFH and the water flow rate was reduced to 1 gal/min. Thus, the retention time in the reaction tank was increased to 60 minutes.

EXAMPLE 2

The assembly shown in FIG. 1 of the drawings was tested for the formation of ferrite from the aqueous solution using the optimum conditions from Example 1. The operating system parameters were as follows:

water flow rate: 1 gal/min ferrous sulfate feeder: 132 g/min sodium hydroxide solution (8M): 147 ml/min retention time: 60 min air flow rate: 60–80 SCFH temperature: 20° C.

EXAMPLE 3

The system shown in FIG. 3 of the drawings was tested for the magnetically susceptible ferrite formation from the aqueous solution. The operating system parameters were as follows:

water flow rate: 1 gal/min ferrous sulfate feeder: 132 g/min ammonium hydroxide solution (30%): 189 ml/min retention time: 50–60 min air flow rate: 60–80 SCFH temperature: 20° C.

These pilot test runs from Examples 1–3 lasted for 7 hours and magnetically susceptible ferrite crystals rapidly formed in the reaction tank. The operating conditions could be varied over a wide range. Processed water was sampled at 1, 3 and 7 hours and analyzed by AA for Fe content. The results are listed below in Table I. The saturation magnetization of ferrite products from Examples 2 and 3 were 71 emu/g and 69 emu/g, respectively. Analysis showed that both samples had spinel crystal structures.

TABLE I

| Time (hr) | Example 1 Fe (ppm) | Example 2 Fe (ppm) | Example 3 Fe (ppm) |
| --- | --- | --- | --- |
| 0 | 4040 | 8080 | 8080 |
| 1 | 6.5 | 3.5 | 2.0 |
| 3 | <0.1 | <0.1 | <0.1 |
| 7 | <0.1 | <0.1 | <0.1 |

REMOVAL OF HEAVY METAL IONS BY FERRITE CO-PRECIPITATION FROM SYNTHETIC WATER

A synthetic water containing various concentrations of selected heavy metals was mixed and tested in the assemblies shown in FIGS. 1 and 3 of the drawings. The composition of heavy metals in the synthetic water was analyzed by AA and is listed below in Table II. The pH of the synthetic water was adjusted to be between 2.8 and 3.0 by the addition of concentrated sulfuric acid.

TABLE II

| Elements | PPM |
|---|---|
| Pb | 1.5 |
| Cd | 8.0 |
| Ni | 3.3 |
| Cr | 8.5 |
| Al | 50 |
| Cu | 98 |
| Mn | 137 |
| Zn | 100 |

EXAMPLE 4

The synthetic water described above was processed in the system shown in FIG. 3 of the drawings. The ferrite co-precipitation process was employed to remove the heavy metal ions from the synthetic water. The test conditions were as follows:

water flow rate: 1 gal/min ferrous sulfate feeder: 110–131 g/min ammonium hydroxide solution (30%): 180 ml/min retention time: 60–70 min air flow rate: 120 SCFH temperature: 20° C.

promoter: 4–5 kg

At the beginning of the run, 4.5 kilograms of seed slurry of ferrite crystals were added to the reaction tank. The air was introduced when the water volume in the reactor tank reached 45 gallons and the above-listed operating parameters were reached after 1 hour. Adding the seed material to the reaction tank at the beginning of the purification process by ferrite co-precipitation allowed for rapid ferrite crystal formation in the reactor without forming green rust. The foam on the surface of the water in the reaction tank was black and shining. Samples of treated water were taken at 1, 2, 3 and 5.5 hours, and the analytical results thereof are set forth below in Table III.

EXAMPLE 5

The system shown in FIG. 1 of the drawings was used to process the synthetic water by ferrite co-precipitation. The operating parameters were as follows:

water flow rate: 1 gal/min ferrous sulfate feeder: 110–131 g/min sodium hydroxide solution (8M): 130 ml/min retention time: 55–60 min air flow rate: 90 SCFH temperature: 20° C.

promoter: 4–5 kg

During the first two hours of the run, the suspension in the reaction tank was slightly brown, and a brown foam was formed on the surface of the water. The air flow rate was reduced to 60–70 SCFH, and an extra 2 kilograms of seed material of ferrite were added to the reactor. The suspension in the reaction tank became black after approximately 1 hour. The run had a duration of 5 hours and treated water samples were taken at 1, 3, 4, 4.5 and 5 hours and analyzed by AA. The results are listed below in Table IV.

TABLE IV

| Time (hr) | Pb (ppm) | Cd (ppm) | Ni (ppm) | Cr (ppm) | Al (ppm) | Mn (ppm) | Cu (ppm) | Zn (ppm) |
|---|---|---|---|---|---|---|---|---|
| 0 | 1.5 | 8 | 3.3 | 8.5 | 50 | 137 | 98 | 100 |
| 1 | <0.1 | <0.1 | <0.1 | <0.1 | <0.1 | <0.1 | <0.1 | <0.1 |
| 3 | <0.1 | <0.1 | <0.1 | <0.1 | <0.1 | <0.1 | <0.1 | <0.1 |
| 4 | <0.1 | <0.1 | <0.1 | <0.1 | <0.1 | <0.1 | <0.1 | <0.1 |
| 4.5 | <0.1 | <0.1 | <0.1 | <0.1 | <0.1 | <0.1 | <0.1 | <0.1 |
| 5 | <0.1 | <0.1 | <0.1 | <0.1 | <0.1 | <0.1 | <0.1 | <0.1 |

Both magnetically susceptible ferrite crystals from Examples 4 and 5 were formed rapidly in the reaction tank and had saturation magnetizations of 72 emu/g and 74 emu/g, respectively.

Thus, it can be demonstrated that economical, continuous processes for the formation of ferrite crystals and the removal of heavy metal ions by ferrite co-precipitation from aqueous solutions at ambient temperature have been achieved.

While different embodiments of the invention have been described in detail herein, it will be appreciated by those skilled in the art that various modifications and alternatives to the embodiments could be developed in light of the overall teachings of the disclosure. Accordingly, the particular embodiments are illustrative only and are not limiting as to the scope of the invention which is to be given the full breadth of the appended claims and any and all equivalents thereof.

I claim:

1. An assembly for ferrite formation and removal of heavy metal ions by ferrite co-precipitation from aqueous solution, said assembly including:

an untreated water tank;

TABLE III

| Time (hr) | Pb (ppm) | Cd (ppm) | Ni (ppm) | Cr (ppm) | Al (ppm) | Mn (ppm) | Cu (ppm) | Zn (ppm) |
|---|---|---|---|---|---|---|---|---|
| 0 | 1.5 | 8 | 3.3 | 8.5 | 50 | 137 | 98 | 100 |
| 1 | <0.1 | 3.9 | 3.1 | <0.1 | <0.1 | <0.1 | 0.60 | 14.2 |
| 2 | <0.1 | 3.8 | 3.1 | <0.1 | <0.1 | <0.1 | 0.40 | 14.1 |
| 3 | <0.1 | 3.5 | 3.2 | <0.1 | <0.1 | <0.1 | 0.38 | 14.4 |
| 5.5 | <0.1 | 3.2 | 3.3 | <0.1 | <0.1 | <0.1 | 0.44 | 14.3 | a first mixing tank in flow communication with said untreated water tank;

a first feeder assembly in material flow communication with said first mixing tank;

a first agitator assembly having a first agitator extending into the interior of said first mixing tank;

a reaction tank in flow communication with said first mixing tank;

an air source in flow communication with the interior of said reaction tank;

a pH assembly for monitoring and controlling the pH of the water in said reaction tank;

a settling tank in flow communication with said reaction tank;

a polishing tank in flow communication with said settling tank; and a magnetic separation assembly connected to said settling tank to remove magnetically susceptible ferrite crystals from said settling tank.

2. An assembly as set forth in claim 1 including a second mixing tank located between and in flow communication with said first mixing tank and said reaction tank.

3. An assembly set forth in claim 1 including a second agitator assembly having a second agitator extending into the interior of said reaction tank.

4. An assembly as set forth in claim 1 wherein said pH assembly includes a chemical mixing tank in fluid communication with said reaction tank.

5. An assembly as set forth in claim 1 including a magnetic particle tank connected to said magnetic separation assembly to collect said magnetically susceptible particles.

6. An assembly as set forth in claim 1 including a water storage tank connected to said polishing tank.

7. An assembly as set forth in claim 1 including a gas collection header in flow communication with each of said reaction tank, said chemical mixing tank, said settling tank, said polishing tank and said magnetic separation assembly.

8. An assembly as set forth in claim 1 wherein said settling tank is a magnetic sweep assist settling tank.

9. An assembly as set forth in claim 1 including means for discharging solution from said reaction tank to said settling tank and means for recirculating a portion of said solution discharged from said reaction tank back into said reaction tank.

10. An assembly as set forth in claim 1 including a second feeder assembly in material flow communication with said reaction tank.

11. An assembly as set forth in claim 2 including means for recirculating a portion of water discharged from said second mixing tank back into said second mixing tank.

12. An assembly as set forth in claim 7 including a gas scrubber assembly attached to said gas collection header.

13. A method for continuous ferrite formation and removal of heavy metal ions by ferrite co-precipitation from aqueous solution, said method comprising:

pumping untreated water having dissolved heavy metal ions into a first mixing tank;

adding ferrous sulfate to said untreated water in said first mixing tank to form a solution in which the molar ratio of iron to heavy metal is greater than 3;

agitating said solution in said first mixing tank;

transporting said agitated solution from said first mixing tank into a reaction tank at a selected flow rate;

agitating said solution in said reaction tank;

distributing air through said solution in said reaction tank;

adding a base to said solution in said reaction tank to adjust and control the pH of said solution to a value greater than 10;

forming a ferrite slurry in said reaction tank; and transporting said ferrite slurry from said reaction tank into a settling tank where heavy metal ions and ferrite crystals co-precipitate to the bottom of said settling tank, wherein a flow rate of said ferrite slurry out of said reaction tank is substantially the same as the flow rate of solution into said reaction tank.

14. The method as set forth in claim 13 including adding ferrite crystals to said solution in said reaction tank to promote formation of ferrite crystals from said solution.

15. The method as set forth in claim 13 including recirculating a portion of said ferrite slurry discharged from said reaction tank back into said reaction tank to promote formation of ferrite from said solution.

16. The method as set forth in claim 13 including:

removing said ferrite crystals from said settling tank to a magnetic separator;

separating said ferrite crystals from aqueous solution in said magnetic separator and pumping said aqueous solution to a polishing tank; and collecting ferrite crystals from said magnetic separator in a particle collection tank.

17. The method as set forth in claim 16 including:

continuously pumping aqueous solution from the top of said settling tank to said polishing tank; and pumping said solution from said polishing tank to a water storage tank.

18. The method as set forth in claim 13 including pumping said solution from said first mixing tank to a second mixing tank and agitating said solution in said second mixing tank.

19. The method as set forth in claim 13 wherein said base is sodium hydroxide.

20. The method as set forth in claim 13 wherein said base is ammonium hydroxide.

21. The method as set forth in claim 13 including recirculating a portion of said solution discharged from said reaction tank back into said reaction tank.

22. The method as set forth in claim 18 including recirculating a portion of said solution discharged from said second mixing tank back into said second mixing tank.

23. The method as set forth in claim 17 wherein said base is ammonium hydroxide and including:

adding one of calcium hydroxide and calcium oxide to said solution in said polishing tank to recover ammonia gas and precipitate calcium sulfate.

24. The method as set forth in claim 20 including collecting ammonia gas formed during the method and separating said collected ammonia gas from air.

25. An assembly for ferrite formation and removal of heavy metal ions by ferrite co-precipitation from aqueous solution, said assembly including:

means for pumping untreated water having dissolved heavy metal ions into a first mixing tank;

means for adding ferrous sulfate to said untreated water in said first mixing tank to form a solution in which the molar ratio of iron to heavy metal is greater than 3;

means for agitating said solution in said first mixing tank;

means for transporting said agitated solution from said first mixing tank into a reaction tank at a selected flow rate;

means for agitating said solution in said reaction tank;

means for distributing air through said solution in said reaction tank;

means for adding a base to said solution in said reaction tank to adjust and control the pH of said solution to a value greater than 10;

means for forming a ferrite slurry in said reaction tank; and means for transporting said ferrite slurry from said reaction tank into a settling tank where heavy metal ions and ferrite crystals co-precipitate to the bottom of said settling tank, wherein a flow rate of said ferrite slurry out of said reaction tank is substantially the same as the flow rate of solution into said reaction tank.

26. An assembly for ferrite formation and removal of heavy metal ions by ferrite co-precipitation from aqueous solution, said assembly including:

an untreated water tank;

a first mixing tank in flow communication with said first untreated water tank;

a first feeder assembly in material flow communication with said first mixing tank;

a first agitator assembly having a first agitator extending into the interior of said first mixing tank;

a neutralization tank in flow communication with said first mixing tank;

a second agitator assembly having a second agitator extending into the interior of said neutralization tank;

an oxidation tank in flow communication with said neutralization tank;

an air supply conduit extending into said oxidation tank;

a first pH sensor located in said neutralization tank;

a second pH sensor located in said oxidation tank;

a pH control assembly in electronic communication with said first and second pH sensors and wherein said pH control assembly controls the pH of water in said neutralization tank and in said oxidation tank to a desired value;

a settling tank in flow communication with said oxidation tank;

a polishing tank in flow communication with said settling tank; and a magnetic separation assembly connected to said settling tank to remove magnetically susceptible ferrite crystals from said settling tank.

27. The assembly as set forth in claim 26 further including a second feeder assembly in material flow communication with said oxidation tank.

28. An assembly as set forth in claim 26 wherein said pH control assembly includes a chemical mixing tank in flow communication with said neutralization tank and with said oxidation tank.

29. An assembly as set forth in claim 26 including a magnetic particle tank connected to said magnetic separation assembly to collect said magnetically susceptible particles.

30. An assembly as set forth in claim 26 including a water storage tank connected to said polishing tank.

31. An assembly as set forth in claim 26 including a gas collection header in flow communication with each of said neutralization tank, said oxidation tank, said chemical mixing tank, said settling tank, said polishing tank and said magnetic separation assembly.

32. An assembly as set forth in claim 26 wherein said settling tank is a magnetic sweep assist settling tank.

33. An assembly as set forth in claim 26 including means for discharging solution from said oxidation tank to said settling tank and means for recirculating a portion of said solution discharged from said oxidation tank back into said oxidation tank.

34. A method for continuous ferrite formation and removal of heavy metal ions from an aqueous solution by ferrite co-precipitation, said method comprising:

pumping untreated water having dissolved heavy metal ions into a first mixing tank;

adding ferrous sulfate to said untreated water in said first mixing tank to form a solution in which the molar ratio of iron to heavy metal is greater than 3;

agitating said solution in said first mixing tank;

transporting the agitated solution from said first mixing tank into a neutralization tank at a first flow rate;

agitating said solution in said neutralization tank;

adding a base to said solution in said neutralization tank to adjust and control the pH of said solution to a value greater than 10;

transporting said agitated solution from said neutralization tank into an oxidation tank at a second flow rate;

distributing air through said solution in said oxidation tank;

agitating said solution in said oxidation tank;

adding a base to said solution in said oxidation tank to control the pH of said solution to a value greater than 10;

forming a ferrite slurry in said oxidation tank; and transporting said ferrite slurry from said oxidation tank into a settling tank at a third flow rate where heavy metal ions and ferrite crystals co-precipitate to the bottom of said settling tank, wherein said first flow rate, said second flow rate and said third flow rate are substantially the same.

35. The method as set forth in claim 34 including adding ferrite crystals to said solution in said oxidation tank to promote formation of ferrite crystals from said solution.

36. The method as set forth in claim 34 including recirculating a portion of said solution discharged from said first mixing tank back into said first mixing tank.

37. The method as set forth in claim 34 including recirculating a portion of said ferrite slurry discharged from said oxidation tank back into said oxidation tank to promote ferrite formation.

38. The method as set forth in claim 34 including:

removing said ferrite crystals from said settling tank to a magnetic separator;

separating said ferrite crystals from aqueous solution in said magnetic separator and pumping said aqueous solution to a polishing tank; and collecting ferrite crystals from said magnetic separator in a particle collection tank.

39. The method as set forth in claim 34 including:

continuously pumping aqueous solution from the top of said settling tank to said polishing tank; and pumping said solution from said polishing tank to a water storage tank.

40. The method as set forth in claim 34 wherein said base is sodium hydroxide.

41. The method as set forth in claim 34 wherein said base is ammonium hydroxide.

42. The method as set forth in claim 34 including recirculating a portion of said ferrite slurry discharged from said oxidation tank back into said oxidation tank.

43. The method as set forth in claim 34 wherein said base is ammonium hydroxide and including:

adding one of calcium hydroxide and calcium oxide to said solution in said polishing tank to recover ammonia gas and precipitate calcium sulfate.

44. The method as set forth in claim 41 including collecting ammonia gas formed during the method and separating said collected ammonia gas from air.

45. An assembly for ferrite formation and removal of heavy metal ions by ferrite co-precipitation from aqueous solution, said assembly including:

means for pumping untreated water having dissolved heavy metal ions into a first mixing tank;

means for adding ferrous sulfate to said untreated water in said first mixing tank to form a solution in which the molar ratio of iron to heavy metal is greater than 3;

means for agitating said solution in said first mixing tank;

means for transporting the agitated solution from said first mixing tank into a neutralization tank at a first flow rate;

means for agitating said solution in said neutralization tank;

means for adding a base to said solution in said neutralization tank to adjust and control the pH of said solution to a value greater than 10;

means for transporting said agitated solution from said neutralization tank into an oxidation tank at a second flow rate;

means for distributing air through said solution in said oxidation tank;

means for agitating said solution in said oxidation tank;

means for adding a base to said solution in said oxidation tank to adjust and control the pH of said solution to a value greater than 10;

means for forming a ferrite slurry in said oxidation tank; and means for transporting said ferrite slurry from said oxidation tank into a settling tank at a third flow rate where heavy metal ions and ferrite crystals co-precipitate to the bottom of said settling tank, wherein said first flow rate, said second flow rate and said third flow rate are substantially the same.

* * * * *